United States Patent
Kavehpour et al.

(10) Patent No.: US 10,415,431 B2
(45) Date of Patent: Sep. 17, 2019

(54) LOW-COST HYBRID ENERGY STORAGE SYSTEM

(71) Applicant: The Regents of the University of California, Oakland, CA (US)

(72) Inventors: Hossein Pirouz Kavehpour, Los Angeles, CA (US); Hamarz Aryafar, Los Angeles, CA (US); Ariana Thacker, Sherman Oaks, CA (US); Mohammad Janbozorgi, Los Angeles, CA (US); Sammy Houssainy, Laguna Hills, CA (US); Walid Ismail, La Crescenta, CA (US)

(73) Assignee: The Regents of the University of California, Oakland, CA (US)

( * ) Notice: Subject to any disclaimer, the term of this patent is extended or adjusted under 35 U.S.C. 154(b) by 13 days.

(21) Appl. No.: 15/757,341

(22) PCT Filed: Sep. 8, 2016

(86) PCT No.: PCT/US2016/050819
§ 371 (c)(1),
(2) Date: Mar. 2, 2018

(87) PCT Pub. No.: WO2017/044658
PCT Pub. Date: Mar. 16, 2017

(65) Prior Publication Data
US 2018/0238196 A1     Aug. 23, 2018

Related U.S. Application Data (60) Provisional application No. 62/215,692, filed on Sep. 8, 2015.

(51) Int. Cl.
*F01K 13/02* (2006.01)
*F02C 6/16* (2006.01)
(Continued)

(52) U.S. Cl.
CPC ............... *F01K 13/02* (2013.01); *F01K 3/12* (2013.01); *F01K 3/186* (2013.01); *F01K 23/06* (2013.01);
(Continued)

(58) Field of Classification Search
CPC . F01K 13/02; F01K 3/186; F01K 3/12; F01K 27/02; F01K 23/06; F01K 27/00;
(Continued)

(56) References Cited

U.S. PATENT DOCUMENTS

| 6,276,123 B1 | 8/2001 | Chen et al. | |
| 9,003,763 B2* | 4/2015 | Coney | F01K 23/10 |
| | | | 60/39.182 |

(Continued)

FOREIGN PATENT DOCUMENTS

| DE | 2636417 A1 | 2/1978 |
| DE | 102012108733 A1 | 3/2014 |

OTHER PUBLICATIONS

Extended European Search Report dated Apr. 2, 2019, issued in corresponding European Application No. EP16845068.2, filed Sep. 8, 2016, 6 pages.

(Continued)

*Primary Examiner* — Hoang M Nguyen
(74) *Attorney, Agent, or Firm* — Christensen O'Connor Johnson Kindness, PLLC (57) ABSTRACT

A low-cost hybrid energy storage system receives energy from one or more external sources, and has an air compressor, low-pressure compressed air energy storage (CAES) system that receives compressed air from the compressor, and a low-temperature thermal energy storage (LTES) system that extracts heat generated by the compression of the air. The LTES system heats an expansion air stream released from the CAES system. The expansion air stream is aug- (Continued)

mented by air from a turbocharger, and further heated by the exhaust stream of a power turbine. At least a portion of the augmented air stream is further heated in a high-temperature thermal energy storage system that receives energy from the one or more external source. The augmented stream is directed to the turbocharger, and then through the power turbine to generate output energy.

19 Claims, 7 Drawing Sheets

(51) Int. Cl.
    *F28D 20/00*     (2006.01)
    *F28F 7/02*     (2006.01)
    *F01K 23/06*     (2006.01)
    *F01K 27/02*     (2006.01)
    *F01K 3/12*     (2006.01)
    *F01K 3/18*     (2006.01)
    *F01K 13/00*     (2006.01)
    *F01K 27/00*     (2006.01)
(52) U.S. Cl.
    CPC ................ *F01K 27/02* (2013.01); *F02C 6/16* (2013.01); *F28D 20/0056* (2013.01); *F28F 7/02* (2013.01); *F01K 13/00* (2013.01); *F01K 27/00* (2013.01); *Y02E 60/142* (2013.01)
(58) Field of Classification Search
    CPC ........ F01K 13/00; F02C 6/16; F28D 20/0056; F28F 7/02; Y02E 60/142
    USPC .................................... 60/650, 659, 682–684
    See application file for complete search history.

(56) References Cited

U.S. PATENT DOCUMENTS

| | | |
|---|---|---|
| 2005/0120715 A1 | 6/2005 | Labrador |
| 2006/0137349 A1* | 6/2006 | Pflanz .................. F03G 7/05 60/641.2 |
| 2009/0158740 A1 | 6/2009 | Littau et al. |
| 2009/0178384 A1 | 7/2009 | Nakhamkin |
| 2009/0282822 A1 | 11/2009 | McBride et al. |
| 2010/0251712 A1 | 10/2010 | Nakhamkin |
| 2010/0326062 A1 | 12/2010 | Fong et al. |
| 2013/0061591 A1 | 3/2013 | Bove et al. |
| 2014/0070544 A1 | 3/2014 | Bronicki |
| 2015/0176526 A1* | 6/2015 | Frazier ................ F01K 13/00 60/793 |
| 2015/0267612 A1* | 9/2015 | Bannari ................ F01D 15/02 60/650 |
| 2016/0177822 A1* | 6/2016 | Howes .................. F02C 6/16 60/785 |
| 2017/0175585 A1* | 6/2017 | Alekseev ............... F01K 3/12 |

OTHER PUBLICATIONS

International Search Report and Written Opinion dated Nov. 13, 2016, issued in corresponding International Application No. PCT/US2016/050819, filed Sep. 8, 2016, 7 pages.

\* cited by examiner

LOW-COST HYBRID ENERGY STORAGE SYSTEM

STATEMENT OF GOVERNMENT FUNDING

This invention was made with State of California support under contract number EPC-14-027 awarded by the California Energy Commission.

BACKGROUND

Energy storage is an important technology for the future of the energy infrastructure, and it is one of the top challenges in the energy industry today. Inexpensive, large-scale, and efficient energy storage is an enabling technology for exploiting intermittent renewable energy sources such as solar energy, wind energy, etc. Improvements in energy storage systems will allow renewable energy sources to comprise a more significant fraction of the national energy grid. Energy storage can be used to smooth out fluctuations in renewable energy generation, reducing or eliminating intermittency and replacing unpredictable energy with manageable, dispatchable energy. For example, energy storage systems may convert electric energy into another mode of storable energy, such as mechanical, potential, chemical, biological, electrical, or thermal energy, and then convert the stored energy back into electric energy when the energy is deployed. Energy storage devices are generally categorized by their performance characteristics and the applications they serve.

Various technologies for energy storage are known. Energy storage devices may be used to bridge the timing gap between energy production and user energy requirements. Solutions for efficient energy storage have gained increasing interest due to the emphasis on the development of alternative energy resources, such as solar electric energy, solar thermal energy, wind energy, and the like. Such alternative energy resources often are only available intermittently. Exemplary technologies for energy storage include high-power flywheels, superconducting magnetic energy storage, high-power super-capacitors, various advanced battery technologies including flow batteries, pumped storage hydroelectric, thermal energy storage, and compressed air energy storage. According to recent studies, compressed air energy storage holds particular promise as an economical technology for bulk energy management.

Compressed air energy storage (CAES) is known to be an effective way to store energy, but it is currently not efficient and not cost-effective. The existing state of the art of CAES is focused on advanced adiabatic methods (AA-CAES) and isothermal methods (I-CAES). However, to date such systems have not been found to provide a competitive alternative for energy storage. However, conventional CAES systems are based on storing energy at high pressure. Energy storage systems wherein the main energy storage is in the compressed air have disadvantages, including high costs associated with compressing to high pressures, energy losses associated with the compressive heating, and the cooling on expansion.

A new hybrid option for energy storage is disclosed and referred to herein as Low-Cost Hybrid Energy Storage System (LCHESS). LCHESS brings down the cost of energy storage while increasing the efficiency of these systems. The LCHESS system combines high-temperature thermal energy storage (HTES) with low pressure compressed air energy storage. A compressor-turbine (reducer/expander) turbocharger augments the air flow from the compressed air reservoir, and the combined flow is heated to high temperatures in the HTES system. The disclosed hybrid system optimizes energy storage between thermal energy storage and compressed air storage.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A low-cost hybrid energy storage system for receiving, storing, and deploying energy from one or more external energy source combines a low-pressure compressed air energy storage (CAES) system, a high-temperature energy storage (HTES) system, and a system for augmenting an outflow from the CAES system upstream of the HTES system. The hybrid energy storage system includes a controller operably connected to the one or more external energy sources, and in signal communication with an air compressor that supplies compressed air to a CAES tank. An energy recovery system captures heat from the compressed air, and includes (i) a first heat exchanger fluidly connected to receive a flow of relatively hot air from the air compressor, (ii) a second heat exchanger fluidly connected to receive a flow of relatively cold air from the CAES tank, (iii) a cold fluid reservoir, (iv) a hot fluid reservoir, (v) a first pump in signal communication with the controller, and (vi) a second pump in signal communication with the controller. The first pump pumps heat transfer fluid from the cold fluid reservoir, through the first heat exchanger, and to the second fluid reservoir. The second pump pumps heat transfer fluid from the hot fluid reservoir, through the second heat exchanger, and to the cold fluid reservoir. The controller controls the first and second pumps such that the flow of cold air from the CAES tank is heated in the second heat exchanger by the heat transfer fluid. An auxiliary flow of hot air is added to the flow of air heated in the second heat exchanger to produce a combined air flow. A recuperator receives the combined air flow, and receive an exhaust air flow from a power turbine to preheat the combined air flow in the recuperator. The HTES system is in signal communication with the controller and includes (i) a high-temperature, high-heat capacity (HTHHC) material, (ii) a flow channel through the HTHHC material configured to receive at least a portion of the combined air flow from the recuperator, and (iii) a means for heating the HTHHC material with at least one of the one or more external energy sources, wherein the received combined air flow from the recuperator is heated in the HTES system. A turbocharger receives the heated combined flow to produce the auxiliary flow of hot air, and the power turbine receives the heated combined flow from the turbocharger and to use the received flow to produce an output energy. The exhaust air flow from the power turbine flows to the recuperator.

In some embodiments the HTHHC material is concrete, for example a refractory concrete.

In some embodiments the means for heating the HTHHC material is a plurality of electric heaters embedded or inserted into the HTHHC material. The electric heaters may be cartridge heaters or resistance ribbons or wires. For example, the electric heaters may be iron-chromium-aluminum alloy ribbon or wire.

In an embodiment the HTHHC material is formed as a block, and further comprises a plurality of metal channels embedded in the HTHHC material and sized to receive the electric heaters. In an embodiment the metal channels further include fins.

In an embodiment the CAES tank operates at a pressure not greater than 750 psi.

In an embodiment the system further includes a third pump configured to pump heat transfer fluid from the cold reservoir, through the recuperator, and to the hot fluid reservoir.

In an embodiment an auxiliary turbine is provided for generating energy, and the second pump is configured to selectively pump heat transfer fluid from the hot fluid reservoir, through the recuperator, and through the auxiliary turbine to generate the additional energy.

In an embodiment, a second heat recovery loop is provided to precool air entering the compressor. For example, the second heat recovery loop may be further configured to precool air entering the compressor component of the turbocharger.

A method for storing energy from an external energy source and for deploying stored energy includes compressing air using energy from the external energy source, recovering thermal energy from the compressed air, storing the recovered thermal energy in a hot fluid reservoir, storing the compressed air in a CAES tank, and heating a high-temperature, high-heat capacity material using energy from the external energy source. The method further includes releasing an air stream from the CAES tank through a control valve, preheating the released air stream using the heat transfer fluid from the hot fluid reservoir, augmenting the air stream using a supplemental air flow from a turbocharger, preheating the augmented air in a recuperator with an exhaust stream from a power turbine, heating the augmented air through one or more channels in the HTHHC material, expanding the air in the turbine of the turbocharger to generate the supplemental air flow, and further expanding the expanded and augmented air from the turbine of the turbocharger to the power turbine to generate the output energy.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
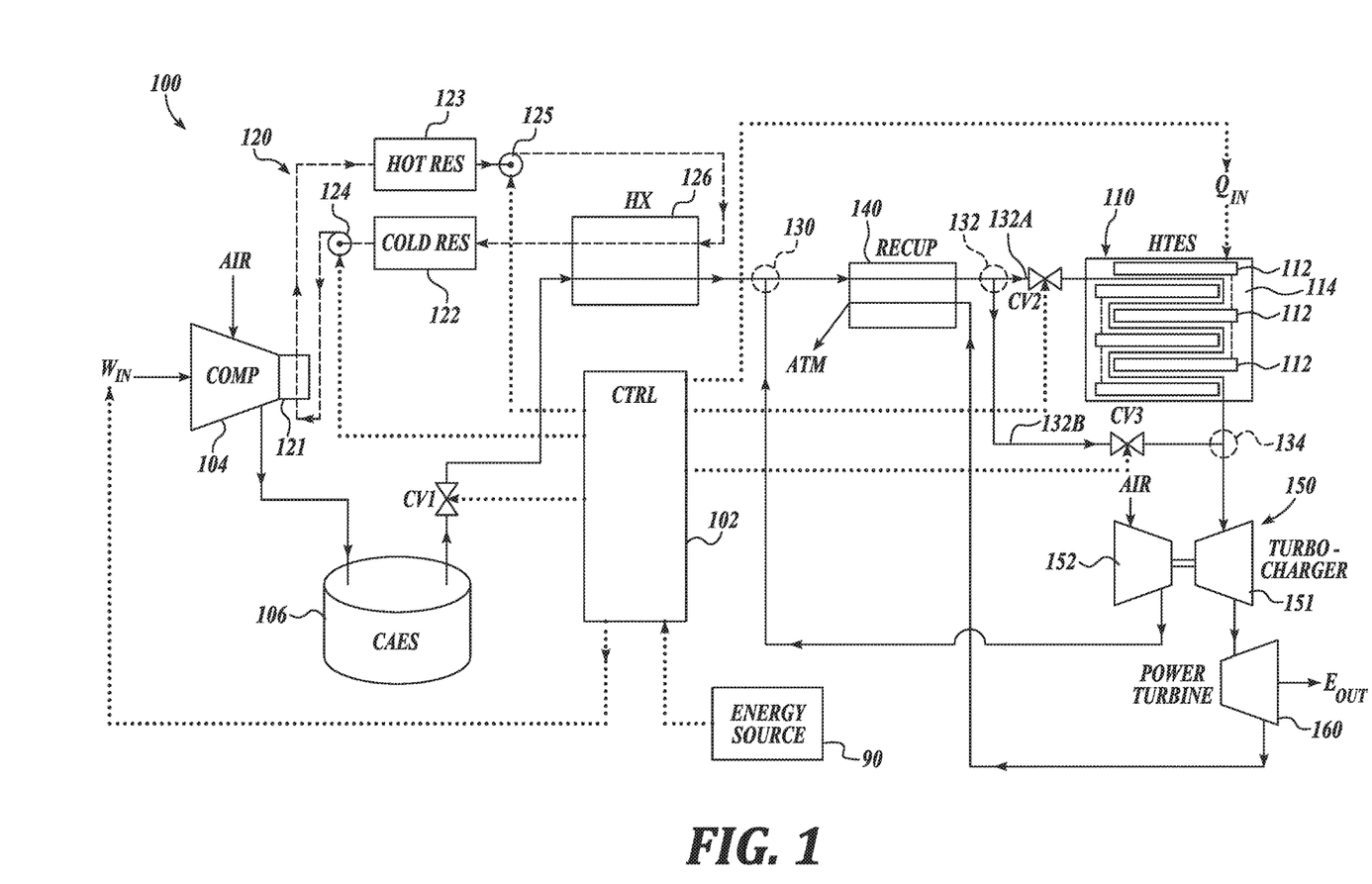
FIG. 1 is a diagram of a first embodiment of a low-cost hybrid energy storage system (LCHESS) in accordance with the present invention.

Exemplary low-cost hybrid energy storage systems (LCHESS) in accordance with the present invention will now be described with reference to the figures, wherein like numbers indicate like elements. A first LCHESS system 100 in accordance with the present invention is illustrated in FIG. 1. The LCHESS system 100 is configured to temporarily store energy, and to make available or deploy the stored energy for later use. As discussed above, efficient and low-cost energy storage is an important challenge in the energy industry, particularly for energy systems that incorporate intermittent energy sources. In an exemplary application, the LCHESS system 100 may store excess energy when generating capacity exceeds demand, and distribute the stored energy when the demand exceeds the generating capacity. In grid energy storage applications the LCHESS system 100 is suitable for load leveling applications. LCHESS system 100 may also be used to allow energy providers that operate a number of different generator systems to optimize energy production. The LCHESS system 100 also allows providers that have multiple and varied energy-generating systems, to optimize the operation of lower-cost energy generating systems, storing excess energy generation from the lower-cost energy production systems during low demand periods, and deploying the stored energy during peak demand periods, thereby reducing the reliance on more expensive energy generating systems.

The LCHESS system 100 will also find applications in off-grid, stand-alone energy generation applications. For example, LCHESS system 100 may provide energy storage for remote energy generation systems that rely on intermittent energy sources, such as solar energy, wind energy, tidal energy, or the like, to provide energy when the intermittent source is not available.

For example, in the LCHESS system 100 shown in FIG. 1, one or more energy sources 90 provide energy to the system 100 through a controller 102 (control signals are indicated by dotted lines, air flows are indicated by solid lines, and non-air heat transfer fluid flows are indicated by dashed lines). The controller 102 may be any suitable control device or system, as are well known in the art, including programmable systems, general purpose systems, custom-designed controllers, and the like. The controller 102 may communication with the various sensors and components with wired connections, wirelessly, or with a combination of wired and wireless communications. The controller 102 will preferably include sensors to monitor the status of the system, including for example, pressure sensors, temperature sensors, position sensors, current/voltage sensors, and the like, as are well known in the art.

The energy source 90 may be any suitable source of energy, including, for example, any renewable energy source. In some embodiments the LCHESS system 100 may be integrated into an energy grid, and obtain energy directly from the grid. The LCHESS system 100 provides two primary modes of energy storage, compressed air energy storage in a (CAES) reservoir 106, and high-temperature thermal energy storage (HTES) in an HTES system 110.

When excess energy from the source 90 is available, the controller 102 may direct excess energy $W_{IN}$ to operate a compressor 104 to compress air and to store the compressed air into the CAES reservoir 106. Because the LCHESS system 100 does not rely solely on the stored air for energy deployment, the system 100 may be designed to store compressed air in the CAES reservoir 106 at relatively low pressures, compared to prior art systems. It is contemplated that the compressor 104 and CAES reservoir 106 may provide air storage in the CAES reservoir 106 at pressures less than 1,000 psi, for example, or at pressures of less than 750 psi in another example. It will be appreciated by persons of skill in the art that lower pressure CAES greatly reduces both the costs associated with the CAES reservoir 106 and the compressor 104. In addition, the lower pressure mitigates inefficiencies and losses related to the high temperatures typically associated with high compression pressures, and the low temperatures typically associated with expanding gasses from high pressures.

From gas law considerations, compressing air raises the temperature of the air. In addition, the compressor 104 generates heat during the compression process. The LCHESS system 100 shown in FIG. 1 includes a low-temperature thermal energy storage system (LTES) in a heat recovery loop 120. The heat recovery loop 120 extracts thermal energy from the compressed air. By extracting thermal energy from the compressed air, the air stored in the CAES reservoir 106 is relatively cooler (i.e., cooled by the extraction of thermal energy) allowing more air mass to be stored in the CAES reservoir 106 at a given pressure.

The LTES heat recovery loop 120 includes a compressor heat recovery system, referred to herein as a compressor heat exchanger 121 for extracting heat at the compressor 104 (either directly from the compressed air or from lubrication oil from the compressor), a cold fluid reservoir 122, a hot fluid reservoir 123, and a first (air or gas) pump 124. During operation of the air compressor 104, the controller 102 activates the first pump 124 in the LTES heat recovery loop 120. The first pump 124 flows a heat transfer fluid from the cold fluid reservoir 122, through the compressor heat exchanger 121, and to the hot fluid reservoir 123. The heat transfer fluid extracts thermal energy from the compressed air. The relatively hot heat transfer fluid is stored in the hot fluid reservoir 123, and the relatively cool compressed air is stored in the CAES reservoir 106. The energy stored in the heat transfer fluid is usefully recovered during energy deployment, as discussed below.

In addition (or alternatively if the CAES reservoir 106 is sufficiently pressurized), when excess energy is available the controller 102 may store excess energy $Q_{IN}$ in the high-temperature thermal energy storage (HTES) system 110. The HTES system 110 incorporates a thermal energy storage material 114 that is stable at high temperatures and has a high heat capacity for storing thermal energy in the form of sensible heat, for example through joule heating. A high-temperature, high-heat capacity (HTHHC) material is herein expressly defined to be a solid phase material having a specific heat capacity greater than 800 J/kg° C. at 25° C. and that retains its strength at temperatures of at least at 1,000° C.

Exemplary HTHHC materials 114 include refractories, high-temperature cements or concretes, stone, brick, sand, and certain ceramic composites. For example, the HTHHC material 114 may be formed as a solid block or may be a containerized volume of loosely packed smaller pellets or particles. If smaller pellets or particles are selected, the HTHHC material 114 may be operated as a fluidized bed.

The HTES system 110 in a current embodiment includes electric cartridge heating units 112 embedded or inserted into the HTHHC material 114.

Figure 2A:
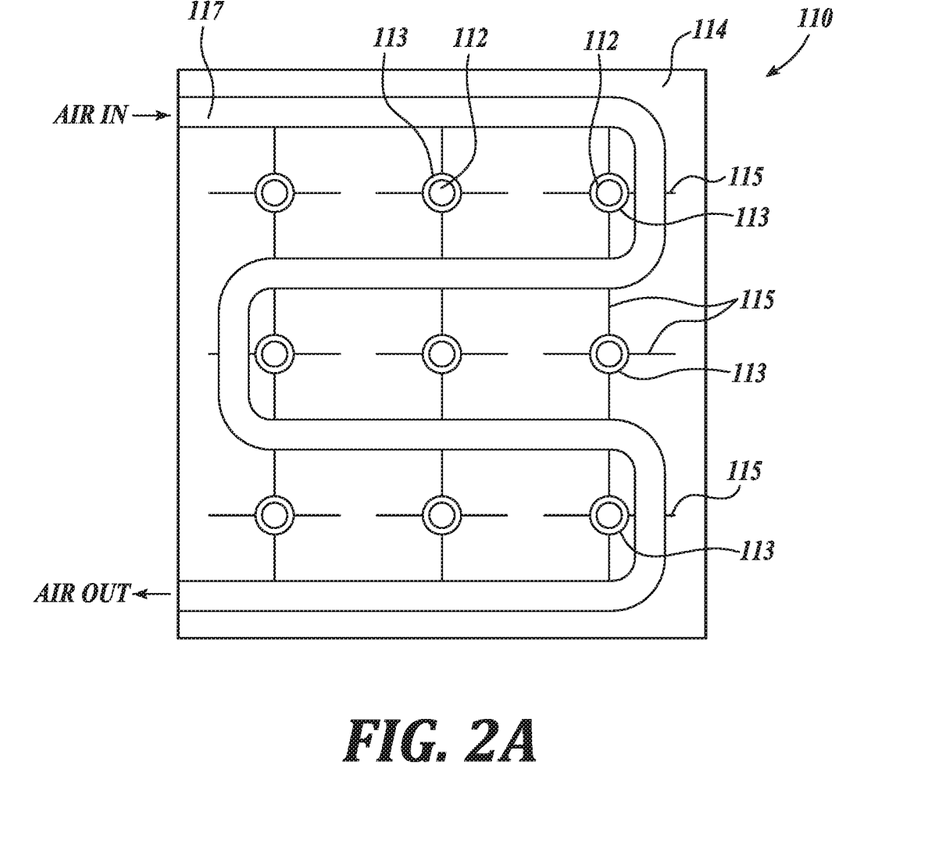
FIG. 2A shows a cross-section of one embodiment of the high-temperature thermal energy storage system for the LCHESS shown in FIG. 1.

In an embodiment shown in cross-section in FIG. 2A, the HTES system 110 includes a block of HTHHC material 114 with channels 113 configured to receive heating units 112, for example cartridge heaters. In some embodiments the channels 113 are formed directly in the block of HTHHC material 114. In other embodiments the channels are formed from tubes in the HTHHC material 114. For example, stainless steel tubes may be embedded in the block of HTHHC material 114. The channels 113 may further comprise exterior fins or extensions 115 having high thermal conductivity, to facilitate transferring heat into the HTHHC material 114.

One or more air channels 117 (one shown), with corresponding air inlets and outlets, extend through the block of HTHHC material 114, such that air flowing through the channels 117 is heated when the HTHHC material 114 is hot. Although a serpentine air channel 117 is illustrated, it is contemplated that a plurality of through air channels may alternatively be used, and may be preferable in some applications, for example to provide sufficient air flow with reduced pressure losses.

Figure 2B:
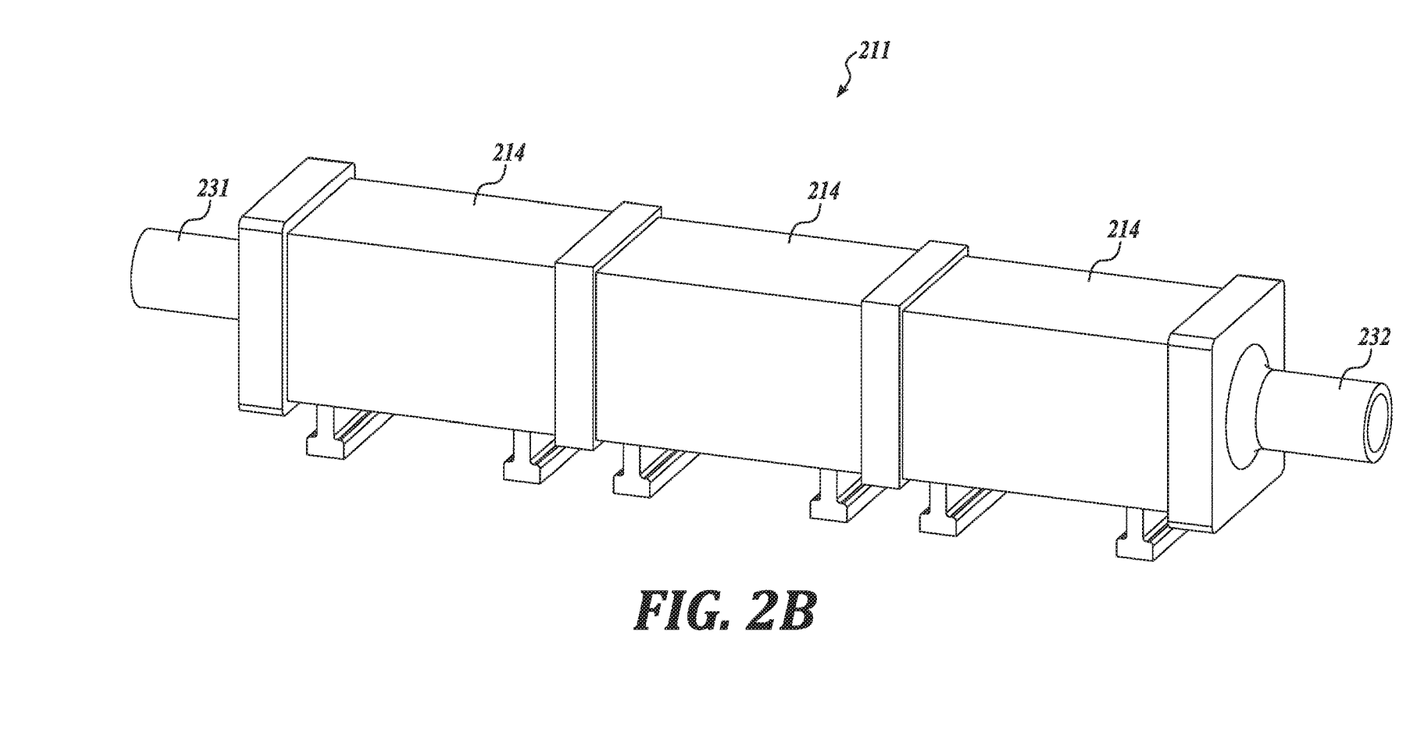
FIG. 2B shows a second embodiment of a high-temperature thermal energy storage system for the LCHESS shown in FIG. 1.
Figure 2C:
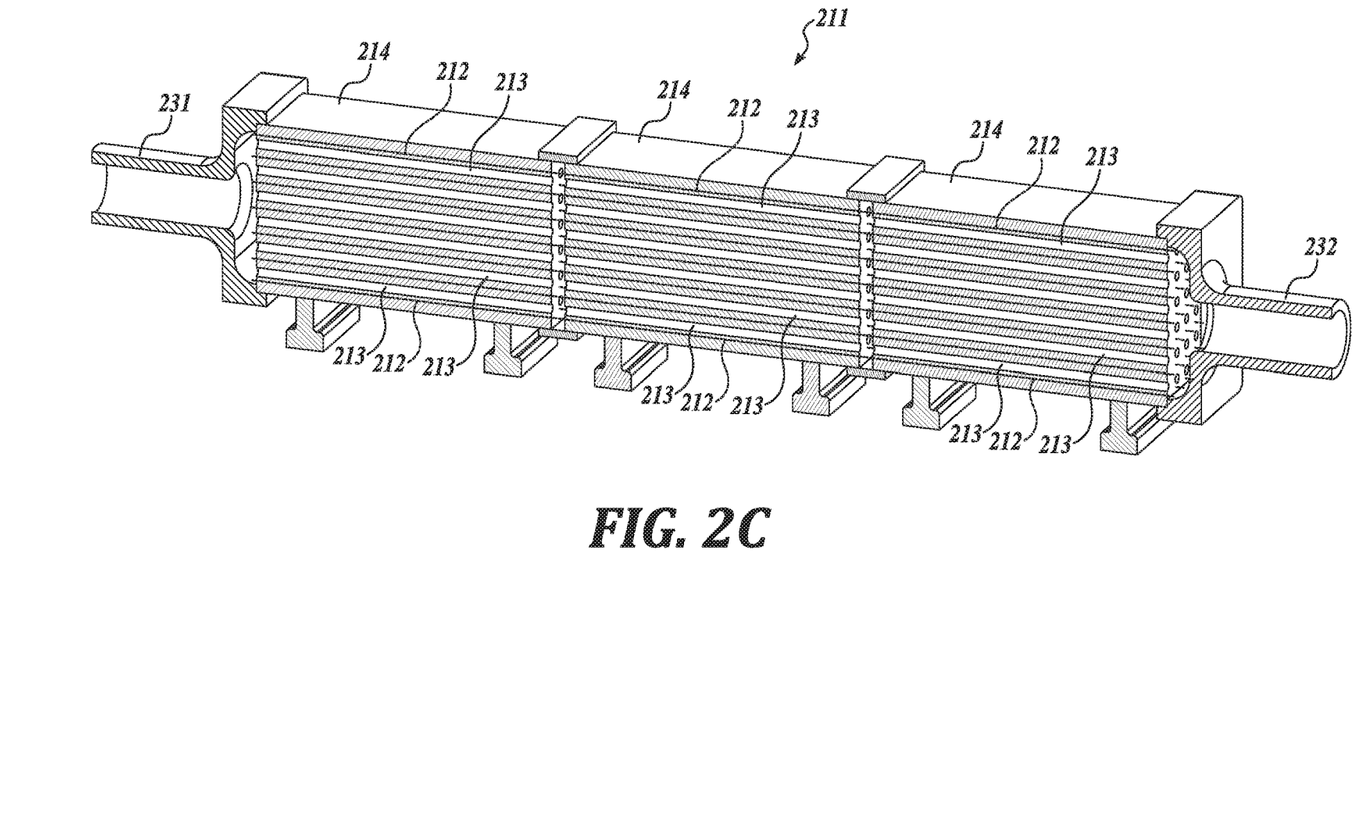
FIG. 2C shows a cross-sectional view of the high-temperature thermal energy storage system shown in FIG. 2B.

FIG. 2B illustrates another embodiment of a modular HTES system 211 having a plurality of blocks of HTHHC material 214 (three shown), assembled in series. FIG. 2C shows the HTES system 211 in cross-section. Each of the blocks of HTHHC material 214 have a plurality of air channels 213 therethrough, with an inlet manifold 231 on one end, and an outlet manifold 232 on an opposite end, wherein air flows through the plurality of blocks 214 in the HTES system 211, essentially in parallel channels 213. In this embodiment, a plurality of lengths of resistance ribbons or wires 212, for example iron-chromium-aluminum alloy ribbon or wire such as that sold under the trademark KANTHAL®, are embedded or inserted into the HTHHC material 214. In an embodiment the ribbons or wires 212 have a temperature rating of about 2,550° F. The ribbons or wires 212 are connected to an electric energy source $Q_{IN}$ (connection not shown) to heat the HTHHC material 214.

In some embodiments the HTES system 110 may comprise a plurality of modular heat transfer units that are connected in parallel or in series, such that the system is readily expandable. It is contemplated in some embodiments that a plurality of HTES systems 110 may be arranged to be selectively and controllably engaged to meet particular demands. It is also contemplated, for example, that the system 100 may be modularly expanded to add additional HTES systems 110 to meet growth requirements.

The excess energy $Q_{IN}$ is directed to the heating units 112 to store the excess energy as thermal energy in the HTES system 110. Optionally the cartridge heaters 112 would include internal thermocouples (not shown). Other heating units or different wattages, and more or fewer heating units 112 may alternatively be used. The heating units 112 may be separately controllable, such that the operation of the heating units 112 can be optimized. Thermocouples may be used to monitor the temperature of the HTHHC material 114 and the resulting signals sent to, and used by, the controller 102 to control the operation of the heating units 112 to reach a desired temperature. In some embodiments the heating units 112 may be embedded directly in the HTHHC material 114.

In other embodiments, for example in solar central receiver systems, the excess energy to be stored in the HTES system 110 may be in the form of thermal energy in a heat transfer fluid. It these embodiments the heat transfer fluid may be flowed through the channels 113 in the HTHHC material 114 to store the thermal energy in the block material 114.

To deploy stored energy from the system 100, the controller 102 activates a control valve CV1 on the CAES reservoir 106 to initiate a flow from the CAES reservoir 106. From gas law considerations, the temperature of the air will drop significantly during expansion. As discussed above, when the CAES reservoir 106 is being pressurized, thermal energy from the air is extracted and stored in a hot fluid reservoir 123 using the LTES compression heat recovery loop 120. During energy deployment the controller 102 activates a second pump 125 in the heat recovery loop 120. The second pump 125 flows relatively hot heat transfer fluid from the hot fluid reservoir 123 through a second heat exchanger 126 to preheat the expansion air from the CAES reservoir 106. The heat transfer fluid then returns from the CAES tank 106 to the cold fluid reservoir 122.

As shown in FIG. 1, the expansion air is preheated in the heat exchanger 126 of the heat recovery loop 120. The preheated air flow from the second heat exchanger 126 is then augmented with a hot and pressurized auxiliary air flow at a flow junction 130. The augmented or combined air flow is further preheated from the exhaust flow from a power turbine 160 in a recuperator 140. The sources of the auxiliary air flow and power turbine exhaust flow is shown in FIG. 1, and discussed below.

The combined air flow then passes into a splitter or second flow junction 132. At least a portion of the combined air flow proceeds through a first outflow line 132A from the flow junction 132, through a second control valve CV2, and into the HTES system 110, wherein the air flow is further heated. The remaining portion of the combined air flow (if any) flows through a second outflow line 132B from the second junction 132 and through a third control valve CV3, bypassing the HTES system 110. The HTES system 110 outflow and the bypass flow are recombined at flow junction 134.

The recombined outflow from flow junction 134 is directed to a turbine component 151 of a turbocharger 150. The turbine 151 drives a compressor 152 that compresses atmospheric air to produce the compression-heated auxiliary flow discussed above, which augments the air flow from the second heat exchanger 126. The auxiliary flow is directed from the compressor 152 into the first flow junction 130.

It will be appreciated that the controller 102 adjusts the control valves CV2 and CV3 to produce a desired flow split between the air flow through the HTES system 110 and the air flow bypassing the HTES system 110, to control the air inlet temperature to the turbocharger 150. Temperature sensors, pressure sensors, flow sensors, and the like (not shown) are provided in signal communication with the controller 102. The controller 102 uses the sensor data to control the valves, heating elements, and other components.

For example, when deployment of energy from the system 100 is first initiated, the HTES system 110 may be at a peak design temperature, which may be much higher than the desired air flow temperature for the turbocharger 150. To produce the desired air flow temperature, a portion of the air stream bypasses the HTES system 110, and rejoins the outflow from the HTES system 110. As the air flow continues to extract heat from the HTES system 110, the HTES system 110 temperature will decrease, and the flow split between the HTES system 110 and the bypass may be adjusted to achieve the desired temperature to the turbocharger 150. The controller 102 is configured to monitor the air flow temperatures, and to control the control valves CV2 and CV3 to produce the desired flow temperature.

The exhaust from the turbocharger turbine 151 is directed to the power turbine 160 to generate the desired deployed energy $E_{OUT}$. Exhaust from the power turbine 160 is directed to the recuperator 140, as discussed above, preheating the combined flow upstream of the HTES system 110. The turbine exhaust in this embodiment is then released to the atmosphere. Optionally, the exhaust, if sufficiently energetic, may be further utilized, for example using additional recuperators.

Although a turbocharger 150 is shown in FIG. 1, alternatively the main compressor 104 may be connected and operated to provide the augmented flow through the flow junction 130. In another embodiment a separate compressor, for example an electrically-powered compressor (not shown) operably connected to the power turbine 160, may provide the augmented flow through the flow junction 130. In some embodiments, for example in stand-alone, intermittent power applications, the controller, and pumps may be powered directly from the energy from the power turbine when the system is generating output energy.

Figure 3:
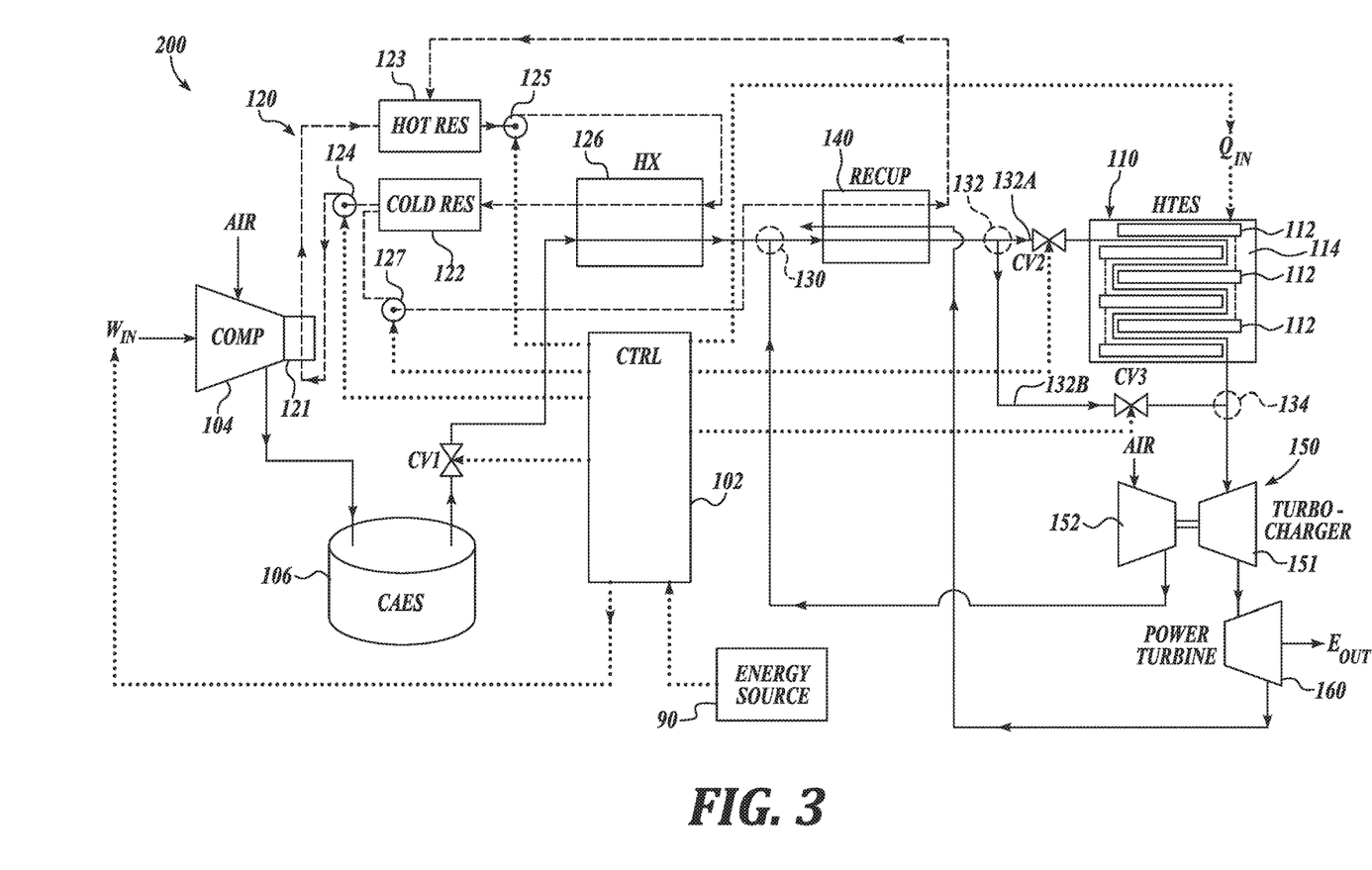
FIG. 3 is a diagram of a second embodiment of an LCHESS in accordance with the present invention, wherein additional heat is recovered from the power turbine exhaust stream.

A second embodiment of an LCHESS system 200 in accordance with the present invention is shown diagrammatically in FIG. 3. This embodiment is similar to the LCHESS system shown in FIG. 1. For brevity and clarity aspects of the LCHESS system 200 already described above will not be repeated.

In this embodiment the heat recovery loop 120 is expanded with a separate circuit to recover thermal energy from the power turbine 160 exhaust stream into the hot fluid reservoir 123. When the power turbine 160 is operating, for example, a third pump 127 is controllably configured to pump heat transfer fluid from the cold fluid reservoir 122, through the recuperator 140, and to the hot fluid reservoir 123.

Figure 4:
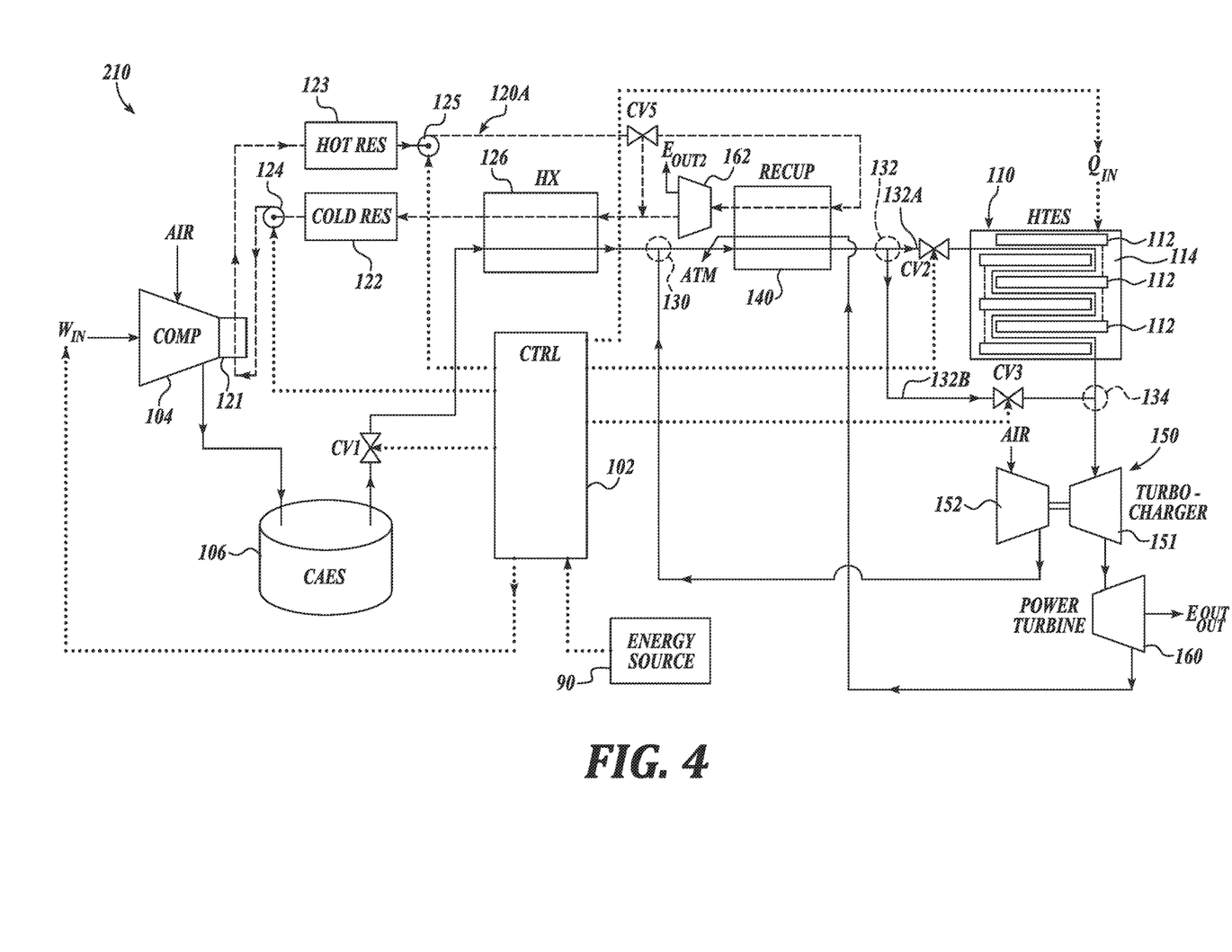
FIG. 4 is a diagram of another embodiment of an LCHESS in accordance with the present invention, further comprising a secondary energy output.

A third embodiment of an LCHESS system 210 in accordance with the present invention is shown diagrammatically in FIG. 4. This embodiment is similar to the LCHESS system 100 shown in FIG. 1. The LTES compression heat recovery loop 120A is modified to recover additional output energy $E_{OUT2}$ from the power turbine 160 exhaust. When the power turbine 160 exhaust contains sufficient thermal energy to produce a phase change in the heat transfer fluid, the second pump 125 pumps heat transfer fluid from the hot fluid reservoir 123 through the recuperator 140, where the heat transfer fluid is further heated. The vaporized fluid may then be expanded through an auxiliary turbine 162 to produce additional output energy $E_{OUT2}$. The heat transfer fluid then proceeds through the heat exchanger 126 to preheat the expansion air from the CAES system 106, as described above, and returns to the cold fluid reservoir 122. Alternatively, for example, if the power turbine exhaust does not retain sufficient residual energy, the control valve CV5 is controlled to bypass the recuperator 140, and operates similar to the LCHESS system 100 shown in FIG. 1.

Figure 5:
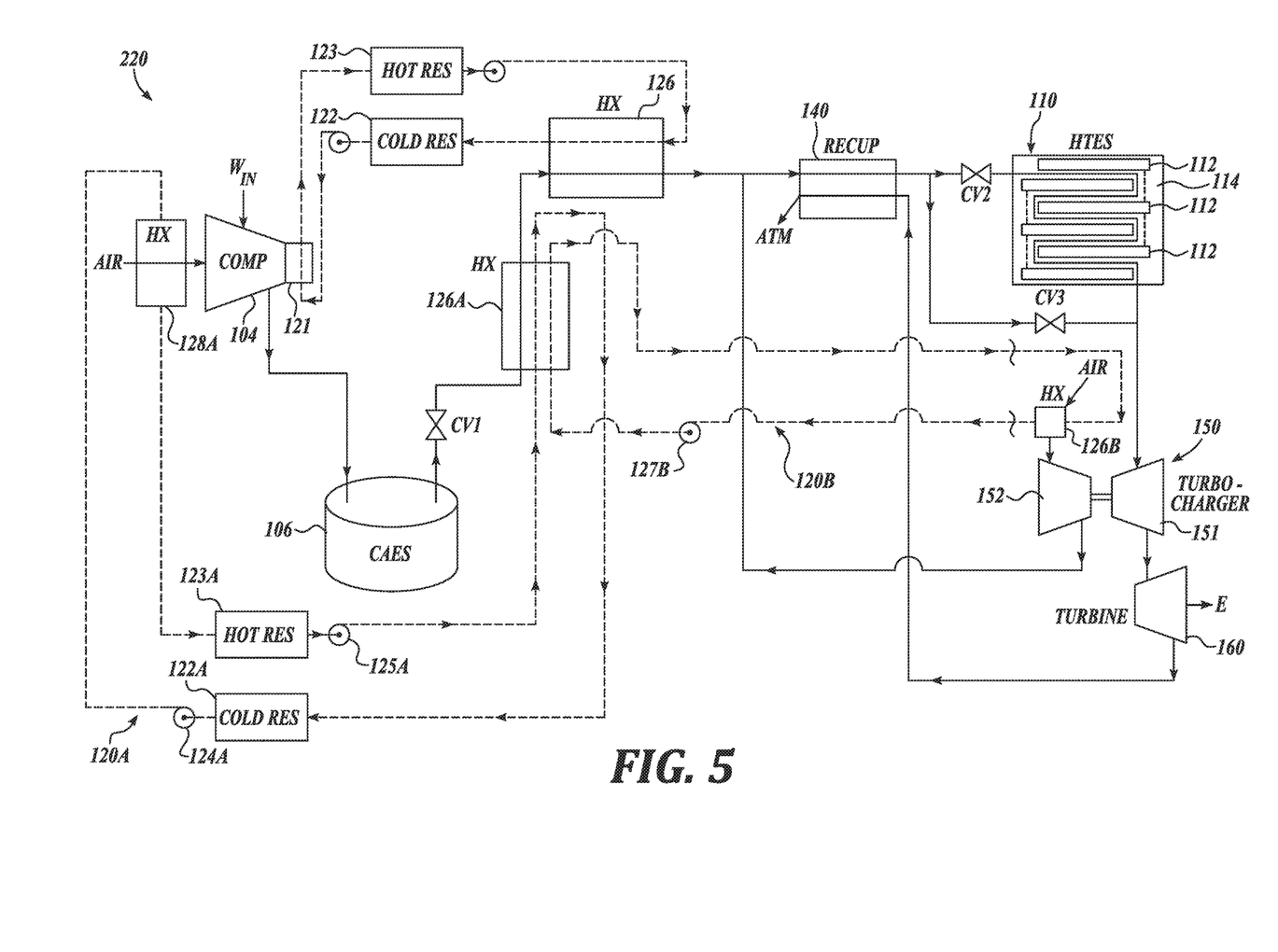
FIG. 5 is a diagram of a second embodiment of an LCHESS in accordance with the present invention, further comprising a compressor inlet air cooling component.

Another embodiment of an LCHESS system 220 in accordance with the present invention is shown diagrammatically in FIG. 5, wherein the control system 102 is omitted for clarity. This embodiment is similar to the embodiment shown in FIG. 1, and further includes a compressor air inlet cooling loop 120A.

The air inlet cooling loop 120A includes an upstream heat exchanger 126A that provides an initial preheating of the cold air discharged from the CAES tank 106 during energy generation. When air is released through control valve CV1, pump 125A pumps a heat transfer fluid from a warm fluid reservoir 123A, through the upstream heat exchanger 126A, and to a cold fluid reservoir 122A. The cold fluid reservoir 122A, cooled due to the expansion of air from the CAES tank 106, may be at ambient temperature, or cooler. When the compressor 104 is operating to supply compressed air to the CAES tank 106, a pump 124A pumps heat transfer fluid from the cold fluid reservoir 122A, through a compressor inlet heat exchanger 128A, and to the warm fluid reservoir 123A. The air provided to the compressor 104 is thereby cooled prior to compression, which reduces the work required by the compressor 104, improving the efficiency of the system 220. The air inlet cooling loop 120A also provides an initial preheating of the expansion air from the CAES tank 106.

Optionally, a second compressor air inlet cooling loop 120B with a pump 127B and inlet heat exchanger 126B may similarly be provided to precool air entering the compressor 152 of the turbocharger 150.

While illustrative embodiments have been illustrated and described, it will be appreciated that various changes can be made therein without departing from the spirit and scope of the invention.

The embodiments of the invention in which an exclusive property or privilege is claimed are defined as follows:

1. A low-cost hybrid energy storage system comprising:
   a controller configured to be operably connected to one or more external energy sources;
   an air compressor in signal communication with the controller and operably connected to at least one of the one or more external energy sources;
   a compressed air energy storage (CAES) tank fluidly connected to receive compressed air from the air compressor, wherein the CAES tank is further configured to release an air flow through a first control valve that is in signal communication with the controller;
   an energy recovery system comprising (i) a first heat exchanger fluidly connected to receive a flow of relatively hot air from the air compressor, (ii) a second heat exchanger fluidly connected to receive a flow of relatively cold air from the CAES tank, (iii) a cold fluid reservoir, (iv) a hot fluid reservoir, (v) a first pump in signal communication with the controller, and (vi) a second pump in signal communication with the controller;
   wherein the first pump is configured to pump heat transfer fluid from the cold fluid reservoir, through the first heat exchanger, and to the second fluid reservoir, and further wherein the second pump is configured to pump heat transfer fluid from the hot fluid reservoir, through the second heat exchanger, and to the cold fluid reservoir;
   wherein the controller is configured to control the first and second pumps such that the flow of cold air from the CAES tank is heated in the second heat exchanger by the heat transfer fluid;
   a flow junction configured to add an auxiliary flow of hot air to the flow of air heated in the second heat exchanger to produce a combined air flow;
   a recuperator fluidly connected to receive the combined air flow, and fluidly connected to receive an exhaust air flow from a power turbine such that the exhaust air flow preheats the combined air flow in the recuperator;
   a high-temperature thermal energy storage (HTES) system in signal communication with the controller and comprising (i) a high-temperature, high-heat capacity (HTHHC) material, (ii) a flow channel through the HTHHC material configured to receive at least a portion of the combined air flow from the recuperator, and (iii) a means for heating the HTHHC material with at least one of the one or more external energy sources, wherein the received combined air flow from the recuperator is heated in the HTES system;
   a turbocharger configured to receive the heated combined flow to produce the auxiliary flow of hot air;
   wherein the power turbine is configured to receive the heated combined flow from the turbocharger and to use the received flow to produce an output energy, and to expel the exhaust air flow to the recuperator.

2. The low-cost hybrid energy storage system of claim 1, wherein the HTHHC material comprises concrete.

3. The low-cost hybrid energy storage system of claim 1, wherein the HTHHC comprises a refractory.

4. The low-cost hybrid energy storage system of claim 1, wherein the means for heating the HTHHC material comprises a plurality of electric heaters embedded in the HTHHC material.

5. The low-cost hybrid energy storage system of claim 4, wherein the electric heaters comprise cartridge heaters or resistance ribbons or wires.

6. The low-cost hybrid energy storage system of claim 5, wherein the electric heaters comprise iron-chromium-aluminum alloy ribbon or wire.

7. The low-cost hybrid energy storage system of claim 5, wherein the HTHHC material is formed as a block, and further comprises a plurality of metal channels disposed in the HTHHC material sized to receive the electric heaters.

8. The low-cost hybrid energy storage system of claim 7, wherein the metal channels further comprise fins that extend into the HTHHC material.

9. The low-cost hybrid energy storage system of claim 1, wherein the CAES tank operates at a pressure not greater than 750 psi.

10. The low-cost hybrid energy storage system of claim 1, further comprising a third pump configured to selectively pump heat transfer fluid from the cold fluid reservoir, through the recuperator, and to the hot fluid reservoir.

11. The low-cost hybrid energy storage system of claim 1, further comprising an auxiliary turbine for generating energy, and wherein the second pump is further configured to selectively pump heat transfer fluid from the hot fluid reservoir, through the recuperator, through the auxiliary turbine, and to the cold fluid reservoir.

12. The low-cost hybrid energy storage system of claim 1, further comprising a second heat recovery loop configured to precool air entering the compressor.

13. The low-cost hybrid energy storage system of claim 11, wherein the second heat recovery loop is further configured to precool air entering a compressor component of the turbocharger.

14. A method for storing energy from an external energy source and for deploying the stored energy, the method comprising:
   storing energy by:
   (i) compressing air with energy from the external energy source;
   (ii) recovering thermal energy from the compressed air such that the compressed air is cooled, and storing the recovered thermal energy in a heat transfer fluid in a hot fluid reservoir;
   (iii) storing the cooled and compressed air in a compressed air energy storage (CAES) tank; and
   (iv) heating a high-temperature, high-heat capacity (HTHHC) material with energy from the external energy source; and
   deploying energy by:
   (v) releasing a stream of air from the CAES tank through a control valve;
   (vi) preheating the released air in a heat exchanger using the heat transfer fluid from the hot fluid reservoir;

(vii) augmenting the preheated air with a supplemental air flow from a turbocharger,
(viii) preheating the augmented air in a recuperator with an exhaust stream from a power turbine;
(ix) further heating the augmented air by flowing the augmented air through one or more channels in the HTHHC material;
(x) expanding the further heated augmented air through a turbine of the turbocharger to generate the supplemental air flow; and
(xi) further expanding the expanded augmented air from the turbine of the turbocharger to the power turbine to generate output energy.

15. The method of claim 14, wherein the HTHHC material comprises a refractory concrete.

16. The method of claim 14, wherein the step of heating the HTHHC material with energy from the external energy source comprises energizing cartridge heaters or resistance wires embedded in the HTHHC material.

17. The method of claim 14, wherein the electric heaters comprise iron-chromium-aluminum alloy ribbon or wire.

18. The method of claim 14, wherein the HTHHC material is formed as a block, and further comprises a plurality of metal channels disposed in the HTHHC material sized to receive the electric heaters.

19. The method of claim 14, wherein the CAES tank operates at a pressure not greater than 750 psi.

* * * * *